United States Patent [19]
Pommellet et al.

[11] 3,937,076
[45] Feb. 10, 1976

[54] DEVICE FOR TESTING TYRES FOR VEHICLES

[75] Inventors: Olivier Pommellet, St-Cloud; Guy Drioton, Rueil-Malmaison, both of France

[73] Assignees: Regie Nationale des Usines Renault, Billancourt; Automobiles Peugeot, Paris, both of France

[22] Filed: June 6, 1974

[21] Appl. No.: 477,002

[30] Foreign Application Priority Data
June 6, 1973 France .............................. 73.20621

[52] U.S. Cl. ...................................... 73/146
[51] Int. Cl.² .............................. G01M 17/02
[58] Field of Search ...................... 73/146, 8

[56] References Cited
UNITED STATES PATENTS

| | | | |
|---|---|---|---|
| 3,060,734 | 10/1962 | Obarski et al. | 73/146 |
| 3,520,180 | 7/1970 | Polhemus et al. | 73/146 |
| 3,546,936 | 12/1970 | Tarpinian et al. | 73/146 |
| 3,577,780 | 5/1971 | Sperberg | 73/146 |

*Primary Examiner*—Donald O. Woodiel
*Attorney, Agent, or Firm*—Fitzpatrick, Cella, Harper & Scinto

[57] ABSTRACT

A tyre testing device comprises a track and a hub mounted on a carriage which can be moved towards and away from the track. The hub can be pivoted about mutually perpendicular axes to simulate changing values of camber angle $\beta$ and angle of lock $\alpha$, and the carriage can be pressed towards the track to vary the tyre loading against the track.

23 Claims, 9 Drawing Figures

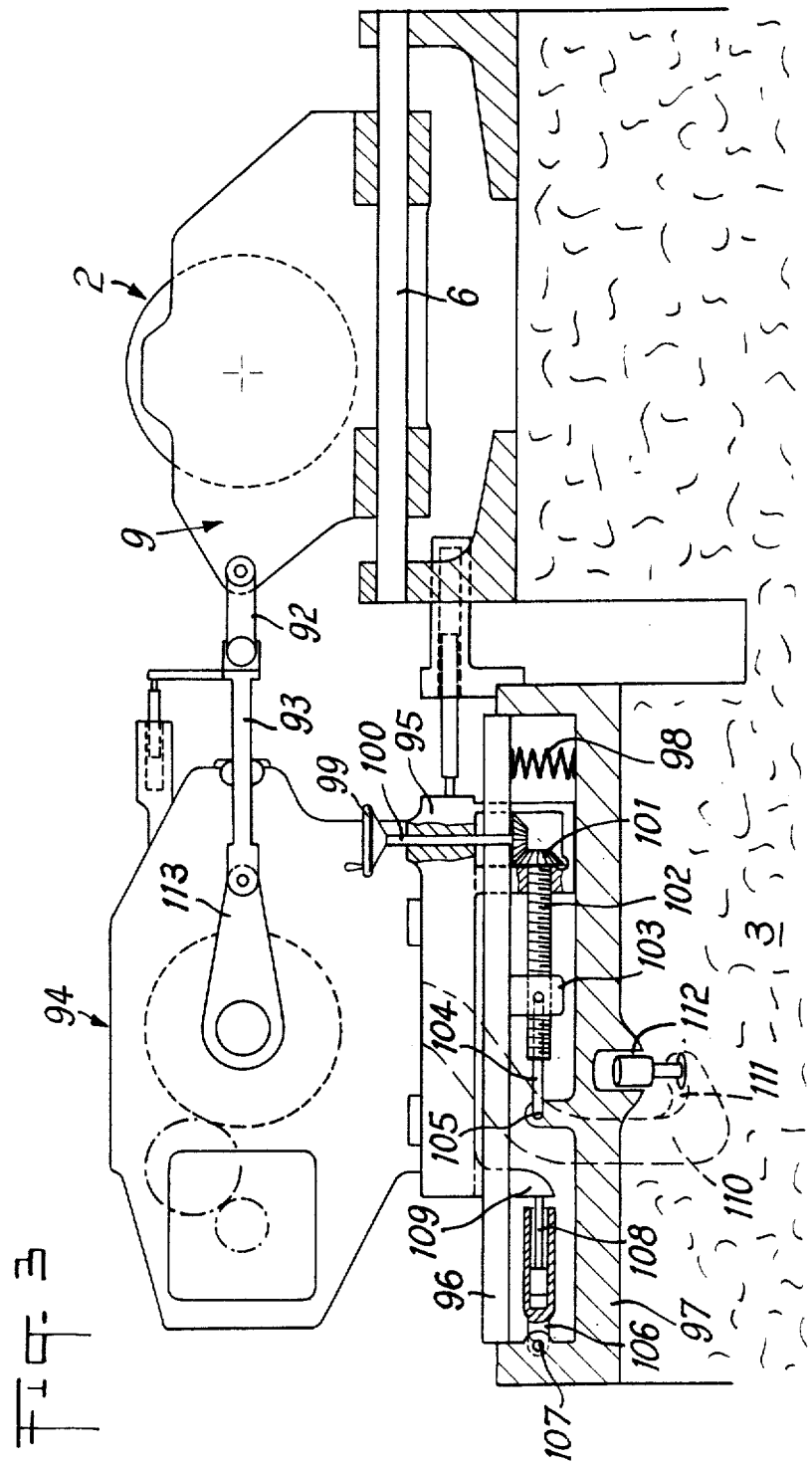

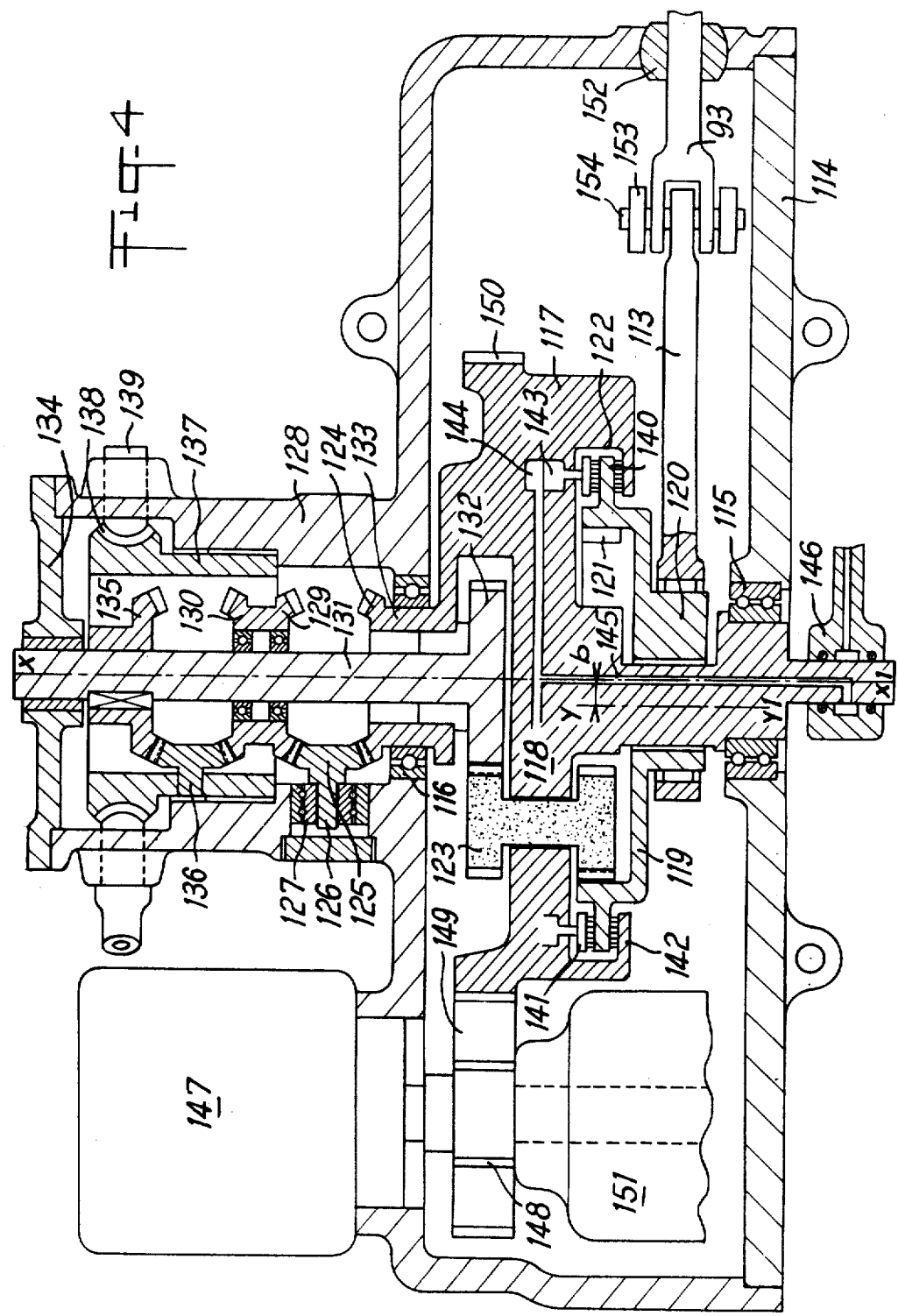

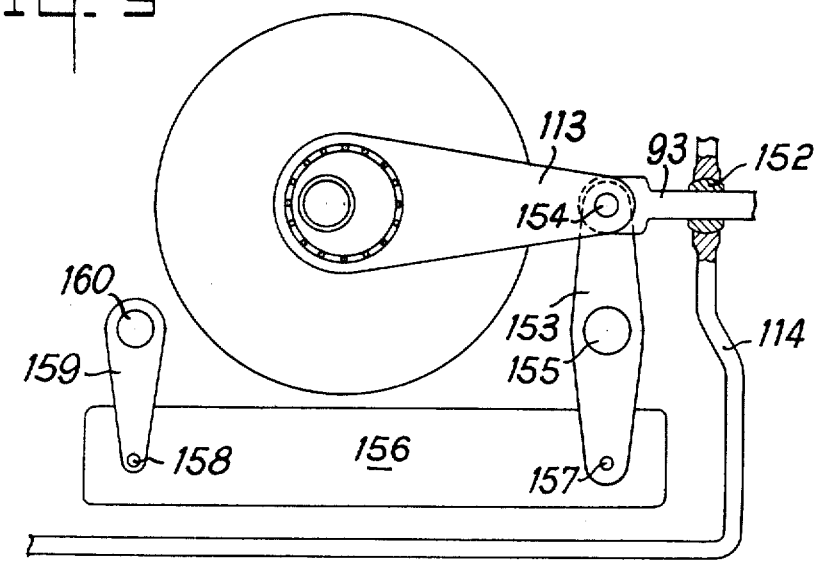
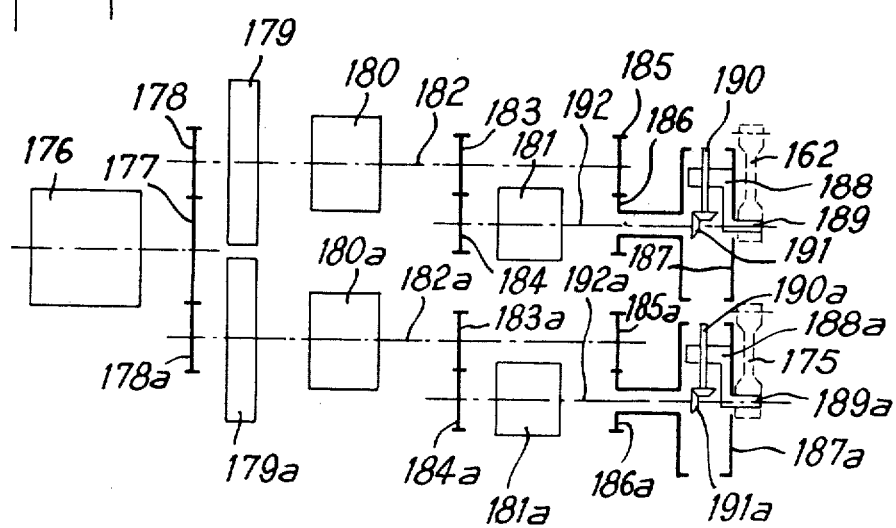

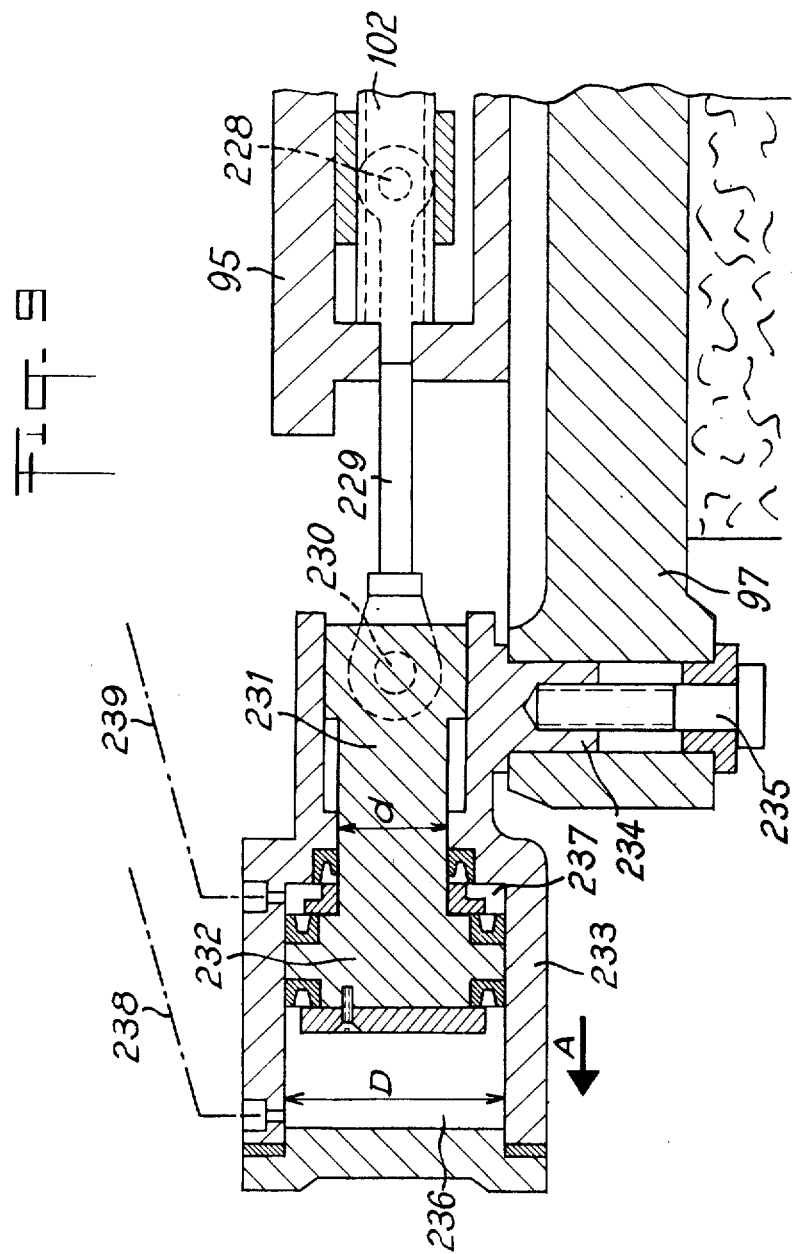

DEVICE FOR TESTING TYRES FOR VEHICLES

The present invention relates to a static and dynamic device for testing tyres for vehicles.

The automobile tyre is a deformable element providing the connection between the vehicle and the road and constitutes an element of prime importance which affects the dynamic behaviour of the vehicle. In this context, it plays an important part in the way in which the vehicle holds the road, and thus affects the safety of the vehicle and the pleasure to be derived from driving the vehicle.

Now, because of this, it is very important to have a detailed knowledge of the various characteristics of the particular tyres used to optimise the dynamic behaviour of the vehicle.

The object of the present invention is to provide a testing device which makes it possible to determine the components of the contact forces developed by a tyre rolling on a track.

Such a device is intented to be used to provide the theoretical and practical information about the tyre necessary for optimising the dynamic behaviour of the vehicle, and to provide as quickly as possible standard information on the various tyres for use on vehicles.

A device of this type enables the wheel to be positioned relative to the plane of the ground in accordance with parameters which are (a) the angle of lock or deflection $\alpha$, (b) the camber angle $\beta$ and (c) the loading of the tyre (that is to say the force applied between the tyre and the ground).

It will also make it possible to measure the numerical values of these parameters and the forces and moments developed in the tread-road contact area as a function of the values of the position parameters.

The characteristics of the tyre can also be demonstrated during a dynamic change (of sinusoidal character) in the various position parameters. In actual use, the tyre is in fact subjected to forces which vary with time, such as steering deflection imposed by the driver, unevenness of the road surface, and the occurence of crosswind on the vehicle.

According to the invention there is provided a device for testing tyres for vehicles comprising means for freely rotatably supporting a wheel equipped with a tyre, a track driveable to pass said tyre in continuous contact therewith, said supporting means comprising a frame slidably supporting a carriage, a hub carried by the carriage for supporting a wheel, means carried by the carriage for pivoting said hub to bring the camber angle of lock $\alpha$ and the angle $\beta$, for controlling the angular orientation of the hub, and means for urging said carriage towards and away from the track to impose a given load urging the tyre against the track.

In order that the present invention may more readily be understood the following description is given merely by way of example, reference being made to the accompanying drawings in which:

FIG. 3 is an elevational view of the load-varying device connected to the carriage which supports the wheel;

FIG. 4 is a view in cross-section of the load-varying device;

FIG. 5 is an elevational view of the connecting-rod bearings for controlling the carriage;

FIG. 7 is a diagrammatic view of the means for controlling the aligning device via a rotating motor;

FIG. 9 is an elevational view, partly in cross-section, of a means for rapidly reversing the wheel-supporting carriage.

Figure 1:
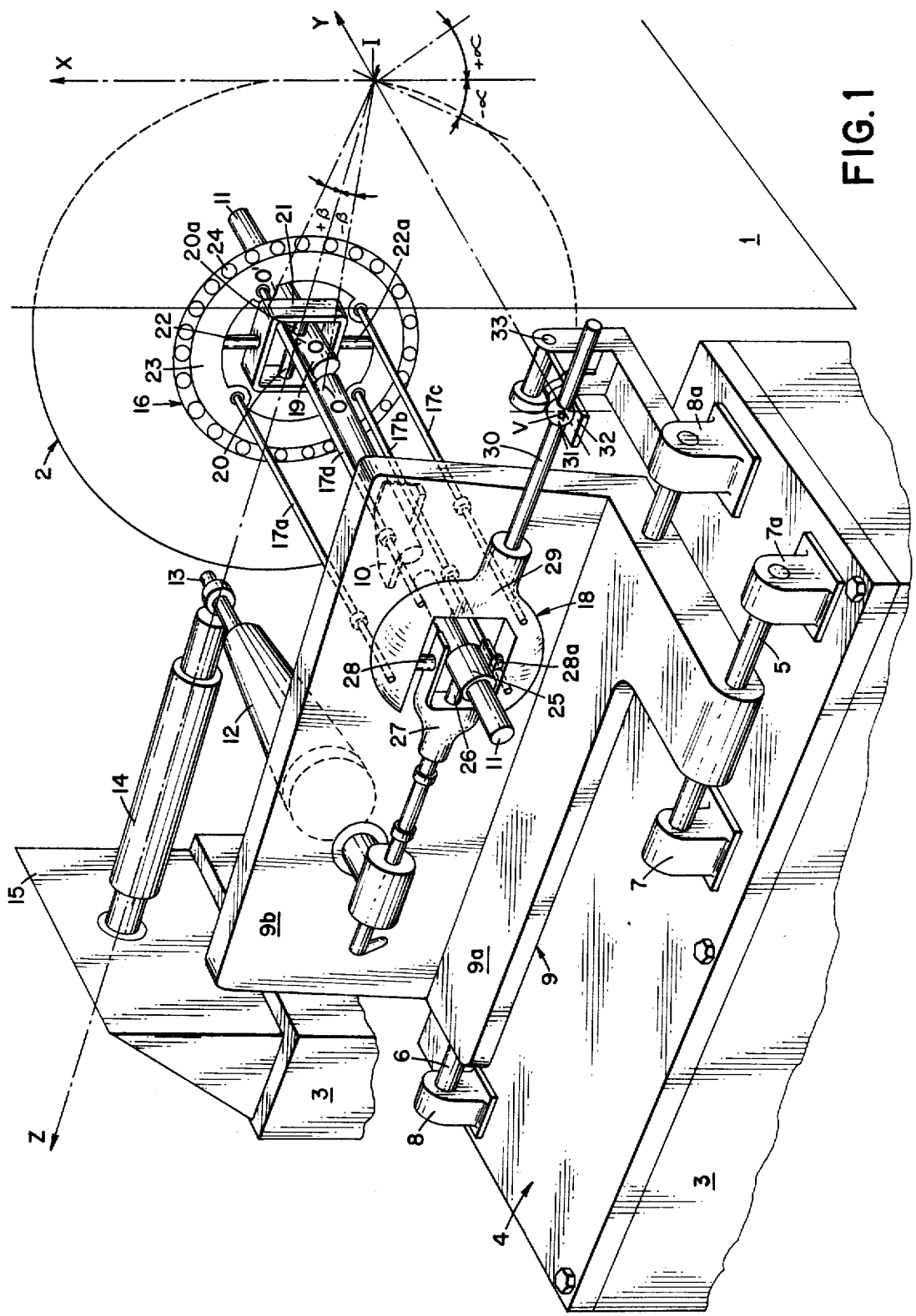
FIG. 1 is a perspective view of an entire tyre testing device constructed according to the invention.

One embodiment of the tyre testing device is shown in FIG. 1. The device comprises a track, represented by the plane 1, which travels past continuously in a vertical direction and in contact with a tyre of an experimental wheel 2 represented in the drawing by its tread median circumference. The axis of the wheel 2 is horizontal for an angle of lock $\alpha$ = zero.

The track 1 may for example be formed by the peripheral surface of a rotating drum with a horizontal axis, not represented in the drawing.

The entire device comprises a pier 3 to which is fastened a frame 4 comprising perfectly parallel slide-bars 5 and 6 fixed to the frame by support members 7 and 7a, and 8 and 8a, respectively.

A carriage 9, consisting of a horizontal portion 9a forming a guide on the slide-bars 5,6 and a vertical portion 9b acting as a support for the components of the device for supporting a wheel and tyre combination, is mounted so as to slide on the slide-bars 5 and 6, in a direction parallel to the axis IZ.

A shaft 11, has its axis horizontal parallel to the axis IY and is fixed by means of straps and tabs 10 to the vertical portion 9b of the carriage 9.

When the angle of lock $\alpha$ and the camber angle $\beta$ are zero, the experimental wheel 2 is in a vertical plane perpendicular to the plane of the track 1 at the zone of track-tread contact. The tread of the tyre on the wheel 2 is thus tangential to the track at the point of contact I, and the horizontal axes IZ parallel to the slide-bars 5 and 6, IY parallel to the shaft 11, and IX parallel to the tread movement at the median plane of the tyre form a reference system.

A column 12 is fixed to the vertical portion 9b of the carriage and has its axis parallel to that of the shaft 11 the column ending in a tip 13 onto which there is articulated via a ball and socket joint, a fluid pressure operated jack 14 which rests on a support 15 fastened to the pier 3. This jack 14, the axis of which coincides with the axis IZ, makes it possible to load the tyre at position I with a force FZ which is always perpendicular to the track 1. The combination consisting of the column 12, the carriage 9 and the shaft 11 is rigid and the force provided by the jack 14 does not impose any transverse force component on the translation slide-bars 5 and 6, which, at least during static operation, serve only to support the weight of the mobile equipment.

Figure 2:
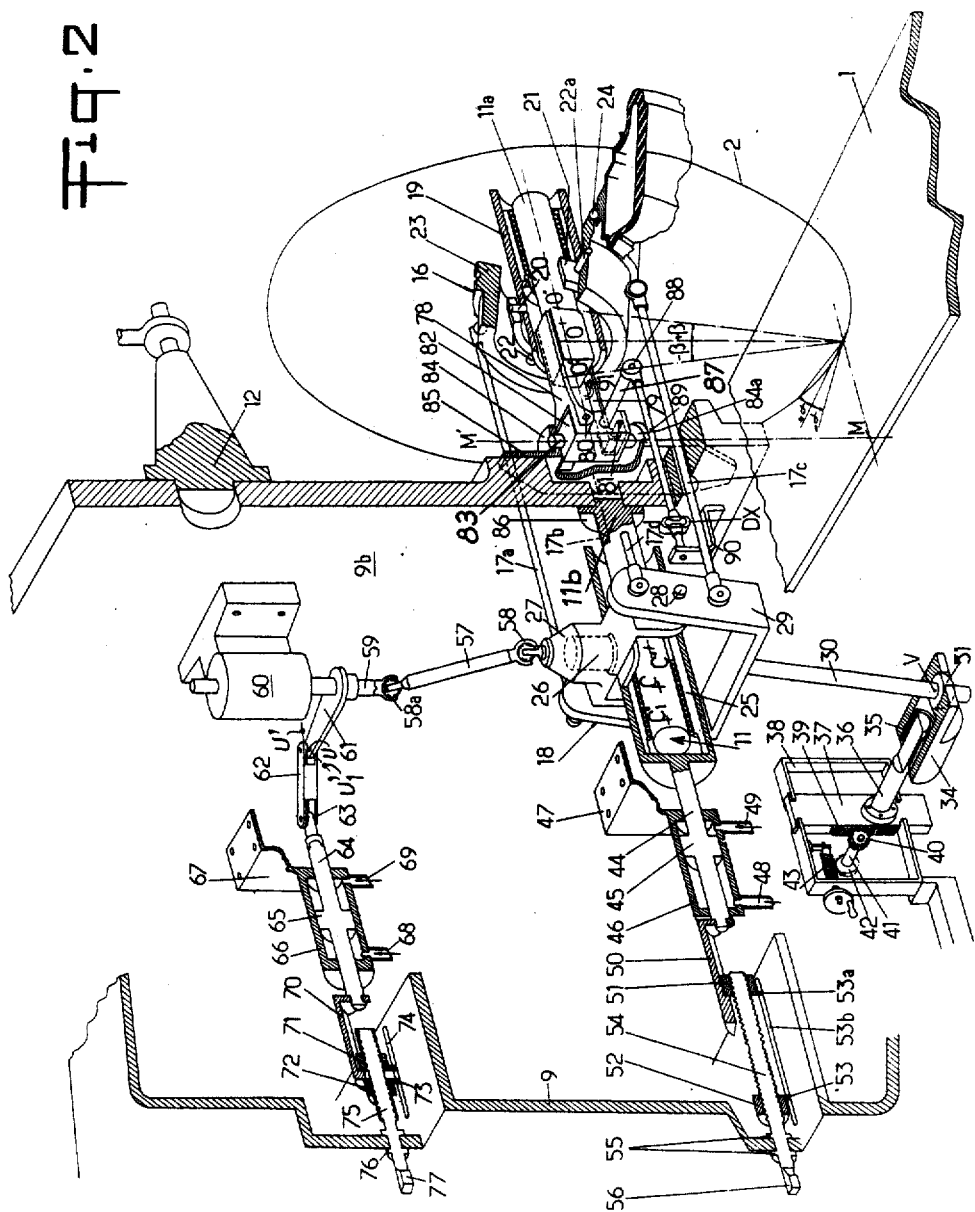
FIG. 2 is a view in perspective of the means for aligning the wheel and tyre combination according to a desired orientation.

The shaft 11 carries on the outside a non-rotating hub gimballing orienting wheel hub 16 by means of which the wheel and tyre combination 2 is mounted on the shaft 11. For orienting the wheel at an angle of lock $\alpha$ and a toe-in angle $\beta$ this wheel hub 16 is connected by rods or tie-bars 17a, 17b, 17c and 17d to an aligning hub 18. (FIGS. 1 and 2).

The wheel hub 16 comprises a ball bearing sleeve 19 slidable along the shaft 11 pivotally carrying a first pair of journals 20 and 20a supporting a cage 21 carrying a second pair of journals 22 and 22a, the common axis of which is perpendicular to the axis common to the journals 20 and 20a of the first pair. On the journals 22 and 22a, there is pivotally mounted a ring 23 to which the rods or tie-bars 17a, 17b, 17c and 17d are articulated by means of ball-and-socket joints, and which receives the wheel 2 which can rotate freely by virtue of a ring of balls 24.

The aligning hub 18 comprises a ball bearing sleeve 25 which is slidable along the shaft 11 like the sleeve 19, and which carries a journal 26 on which is pivotally mounted a bifurcated carrier 27 which has a pair of journals 28 and 28a, extending outwardly therefrom on an axis perpendicular to the axis of the journal 26. The journals 28 and 28a receive a further bifurcated carrier 29 onto which the other ends of the rods or tie-bars 17a, 17b, 17c and 17d are articulated by means of ball-and-socket joints.

The carrier 29 carries a rod 30 extending along an axis perpendicular to the axis of the journals 28 and 28a and able to slide in a ball-and-socket joint 31, which is itself shiftable vertically on a lever 32 hinged to the frame 4 about an axle 33, parallel to the axis IZ.

In the embodiment of aligning device shown in FIG. 2, the ball-and-socket joint 31 is pivotally mounted in a support 34 which has a ball bearing 35 in which a rod 36, connected to a mechanism for adjusting the alignment of the ball-and-socket joint 31, can slide.

This mechanism comprises a scale 37 firmly fixed to the rod 36 but movable parallel to the axis IZ, guided in slots machined in a structure 38 fixed to the frame 4. Precise adjustment without any play is achieved by means of a system which comprises a rack-bar 39, firmly fixed to the scale 37 and meshing with a pinion 40 whose axle 41 carries a pinion 42 which meshes with a worm screw 43 rotatably mounted on the structure 38 and connected to an operating handwheel.

Also in FIG. 2, the sleeve 25 which slides on the shaft 11 is extended by a rod 44 carrying a piston 45 reciprocable along a jack cylinder 46 screwed to the frame of the carriage 9 by means of a bracket 47.

Fluid under pressure can be conveyed at will to each of the chambers of this jack via ports 48 and 49.

The limits of movement of the sleeve 25, under the effect of the fluid under pressure, are defined and restricted to suitable values by a stop cylinder 50, connected to the piston rod 44, and enclosing abutment stops 51 and 52.

These stops 51 and 52 consisting of nuts, locked against turning by elements 53 and 53a travelling in a slot 53b, are restricted to linear movements which are symmetrical relative to the point C by means of a supporting screw 54 having separate thread portions of opposite hand. The screw 54 is prevented from moving longitudinally by a double stop comprising shoulders 55 abutting the frame of the carriage 9. A controlling handwheel (not shown) can be placed on the square head 56.

Control during dynamic operation is achieved by introducing the pressure fluid alternately through the ports 48 and 49 at the desired frequency.

Furthermore, the carrier 27 (FIG 2) of the aligning device can be given limited rotational movements about its means position, no matter what the position of the sleeve 25 may be, by means of a transmission comprising a rod 57 having at its ends torque transmitting universal drive joints 58 and 58a which connect shaft 57 to the carrier 27 and a shaft 59 rotatably mounted in a bearing 60 firmly fixed to the frame of the carriage 9. A lever 61 is keyed to the shaft 59, and this lever oscillates between two extreme positions U' and U'1 under the effect of a connecting link 62 articulated at 63 to a piston rod 64 of a piston 65 reciprocable within a jack cylinder 66 which is fixed to the frame of the carriage 9 by means of a support bracket 67.

Fluid under pressure can be conveyed at will to each of the chambers of this jack via ports 68 and 69.

The movements of the piston 65 effect pivoting of the lever 61 and consequently of the carrier 27 under the effect of the fluid under pressure in jack cylinder 66, and these movements are limited to suitable values by a stop cylinder 70 connected to the piston rod 64 and enclosing stop nuts 71 and 72, which are locked against rotation by elements 73 and 73a travelling in a slot 74. The nuts 71, 72 are restricted to symmetrical linear movements by a screw 75 having thread portions of opposite hand, the screw 75 being held against longitudinal movement by a double stop shoulder 76 abutting the frame of the carriage 9. A controlling handwheel can be placed on the square head 77.

The device illustrated in FIGS. 1 and 2 functions in the following way.

A camber angle $\beta$ is imparted by means of the jack 45 and 46, whose extreme positions are adjusted by the stops 51 and 52. The sleeve 25 is forced, by the jack 45, 46, to slide along the shaft 11 so that the centre C takes up the position C'. The dimension CV of axis 30 and carrier 29 is for the purpose equal to the dimension OI, O being the centre of the aligning or orienting hub 16 and OI thus the radius of the tyre under load.

The rods or tie-bars 17a, 17b, 17c and 17d, which are parallel and of equal length, hold the ring 23 of the wheel hub 16 and the carrier 29 of the aligning hub in parallel planes. They are equipped with tensometers (not shown) acting in tension and compression.

This connection between the carrier 29 and ring 23 forces the center O of the wheel hub 16 to take up the position O', so that the wheel assumes an inclination O'I, giving a positive camber angle $+\beta$.

Negative camber angle $-\beta$ is induced in the same way by operating the jack 45, 46 to shift the sleeve 25 in the opposite direction so that the centre C of the sleeve 25 takes up the position C'1. Simultaneously, the sleeve 19 moves so that the centre O of the hub 16 takes up the position O'1 and the wheel assumes an inclination O'1, giving a negative camber angle $-\beta$.

In order to change the angle of lock or steering deflection $\alpha$, the carrier 27 of the aligning hub 18 is rotated by means of the lever 61 which is actuated between its two extreme positions U' and U'1 by the jack 65, 66.

The rotation of the carrier 27 causes the aligning hub to rotate about axis CV and, as a result of the transmission of the rods or tie-bars 17a, 17b, 17c and 17d, causes the wheel hub 16 to pivot about axis OI, if the camber angle is zero, or about respective axes O'I and O1'I if the camber angle is positive or negative. The angles of lock $+\alpha$ and $-\alpha$ have been illustrated in FIG. 2 for a value of the camber angle $\alpha = 0$.

The articulation of the shaft 11 about axis MM' and a further hub 82 for suspending the shaft part 11a carrying the wheel hub 16 have been represented in FIG. 2.

The shaft 11 comprises two parts 11a and 11b. The part 11a on which the sleeve 19 travels has one end machined in the form of a parallelepiped whose two opposite vertical faces receive two spring leaves 78 and 79 attached by screws (not shown). The free ends of the leaves 78 and 79 are hinged about axles 80 and 81, via bearings, to a turret 82 which carries two journals 83 pivotally mounted in lugs 84 and 84a of a housing 85 fixed to the vertical face 9b of the carriage 9 as well as the part 11b of the shaft 11 fixed to the carriage 9 by means of a flange 86.

FIG. 2 also shows a rod 87, fixed to the turret 82, and which is hinged at 88 at its free end to one end of a rod 89 which is fixed at its other end to a bracket 90 firmly fixed to the carriage 9. A tensometer D$x$ is interposed on the rod 89 and measures the force necessary to immobilise the rotating turret 82 and to hold the part 11a of the shaft 11 on the intended geometric axis coaxial with shaft part 11b.

The part 11a of the shaft 11, due to its resilient suspension is constrained for constant orientation by a parallelogram linkage comprising the leaf springs. It can thus only move parallel to itself as it moves under the effect of the tyre loading, and stress gauges 91 placed on the two opposite faces of the leaf spring 79 makes it possible to measure the bending moment independently of the tensile forces in rod 89. These gauges, suitably positioned, thus make it possible to measure the tyre loading force FZ independently of the position of the point of application of the wheel hub.

Although jacks have been exemplified for producing the shift of the carriage 9 and the pivoting of the wheel hub according to a camber angle $\beta$ and an angle of lock $\alpha$, it is obvious that it would be possible to use any other drive component especially a rotating motor equipped with pinion gearing or jacks which are controlled by either a movement, a force or the value of an angle in accordance with a preselected form of signal.

Another means of controlling the carriage 9 has been represented in FIG. 3 where the carriage 9 is connected via a connecting rod 92 and a sliding rod 93 to a connecting rod 113 of a load-varying device 94 which is mounted on a mobile platform 95 and travels on rails 96. The rails 96 rest, via elastic components 98, on a support frame 97 fixed to the pier 3. The mobile platform 95 is thus guided by the rails 96 which correspond to channels machined in the mass of the platform 95.

The elastic components 98 make it possible to raise the platform 95 and the components fixed thereto so as to free the resting surfaces and to reduce them substantially.

A force of not unduly high value is required to shift the entire platform 95 along the rails, and this force can be provided manually by a crankhandle 99 fixed to the end of a shaft 100 which is rotatably mounted in the platform and which is connected at its other end via a pair of bevel gears 101 to a screw 102 over which there is threaded a square nut 103 coupled by connecting rods 104 to a fixed point 105 of the frame 97. However, jacks 106, the cylinders of which are fixed at 107 to the frame 97, act, via their rods 108 on a boss 109 of the platform 96. A biasing pressure in the load-applying jacks 106 makes it possible to help the operator to bring the wheel hub 16 closer to the track 1 and to apply a greater loading to the tyre 2.

In FIG. 3 there is shown in broken lines, in perspective, a detail of a solid projection of the same overall length as the platform 95 to which it is firmly fixed. The lower part 111 is thus in the form of a flat slide-bar which slides opposite piston rods of jacks 112 with vertical axes firmly fixed to the frame 97.

When the position of the platform 95 has been selected and it is desired to lock this platform solidly to the pier 3 in such a way that it cannot be moved, especially in the case where the operator wishes to carry out dynamic tests on the angles $\alpha$ and $\beta$ or on the load, the following operations are carried out.

To achieve vertical immobilisation, the immobilising jacks 112 supplied with fluid under pressure exert a force on the platform 95, compressing the elastic components 98 carrying the rails 96 onto the fixed frame 97.

To achieve horizontal immobilisation, the load-applying jacks 106 are supplied with fluid under a high pressure which puts the entire screw control device 102 under stress and takes up all mechanical play which exists.

The load-varying device 94 which converts a circular movement into a rectilinear movement of variable amplitude has been represented in detail in FIGS. 4 and 5.

The load-varying device comprises a casing 114 in which there is rotatably mounted a crank shaft 117, for rotation about an axis $xx_1$, by means of ball bearings 115 and 116. The crank-shaft 117 has a single crank-pin 118 which has an axis $yy_1$ parallel to the above-mentioned axis $xx_1$ and spaced by a fixed lateral distance $b$ from the axis $xx_1$.

On the crank-pin 118, there is freely rotatably mounted an eccentric part 119 which is concentric about axis $yy_1$ and has a hub 120 centred on axis $xx_1$. One of the ends of the connecting rod 113 which is connected to the rod 93 is rotatably mounted on the hub 120 by means of a bearing.

On the other hand, the eccentric part 119 has an internal ring gear 121 centred on axis $yy_1$ and also a circular socket 122 of the crank-shaft 117.

The eccentric part 119 can be displaced angularly relative to the crank-shaft 117 when a satellite 123 freely rotatably mounted on a disc portion of the crank-shaft 117, is rotated.

The angular displacement of the eccentric part 119 relative to the crank-shaft 117 causes the hub 120 to take up a differently eccentric position relative to the axis $xx_1$.

The eccentricity can thus vary from O as represented in FIG. 4 to the value $2b$ for rotation of 180° of the eccentric part 119 relative to the crank-shaft 117. The relative movement of the eccentric part 119 relative to the crank-shaft 117 is controlled by a differential device to be described below.

At one of its ends, the crank-shaft 117 carries a bevel gear 124 which meshes with a satellite pinion 125, the spindle 126 of which is rotatably mounted by means of a ball bearing 127 in a projecting part 128 of the casing 114. This pinion 125 drives in the reverse direction the group of gearwheels 129 and 130 freely rotatably mounted on a shaft 131 of a sun gear 132 which meshes with the satellite 123.

The shaft 131 is mounted at one end so as to rotate freely in a hollow pin 133 of the crank-shaft 117 and at the other end in an end bearing 134 of the casing part 128 of the device.

On the shaft 131, there is keyed a bevel gear 135 which meshes with a satellite pinion 136 freely rotatably mounted on a cage 137 and also meshing with the gearwheel 130 so as to form therewith a differential.

The angle of rotation of the cage 137 relative to the projecting part 128 of the fixed casing is equal to the angular displacement of the crank-shaft 117 relative to the eccentric part 119. The eccentricity can thus be controlled even during the rotation of the differential cage 137. This movement is controlled by a shaped cog-wheel 138 on the cage 137, the cogwheel meshing with an endless screw 139 which is rotated manually.

The position of the eccentric part 119 relative to the crank-shaft 117 must be held constant after choosing the eccentricity, notwithstanding the large forces transmitted by the connecting rod 113. This constant relationship is achieved firstly because of the irreversibility control using the wheel 138 and endless screw 139 and also by a hydraulically operated braking device.

This braking device comprises a small flange 140 provided at the periphery of the eccentric part 119 which is rotatable in the circular socket 122 of the crank-shaft 117, it being possible for the said small flange 140 to be clamped between side-plates 141 and 142 equipped with friction linings and firmly fixed to the crank-shaft 117.

The movable side-plate 141 is controlled by a row of axial pistons 143 distributed in cylinders 144 positioned in the crank-shaft 117, the said cylinders being supplied via channels 145 pierced in the crank-shaft 117 and connected at the end of the crank-shaft journal to a manifold 146.

The crank-shaft 117 is rotated by means of a hydraulic motor 147 which is fixed to the casing 114 and the drive-shaft of which is connected via a pair of gearwheels 148 and 149 to an external gear 150 of the crank-shaft 117. An inertia flywheel 151 is mounted on the axle of the gearwheel 148.

The connecting rod 113 hinged to the hub 120 of the eccentric part 119 is connected to the rod 93 which slides in a ball-and-socket joint 152 mounted in the casing 114, the said rod 93 being carried by a bifurcated connecting rod 153 and hinged about an axle 154 (FIGS. 4 and 5). The connecting rod 153 is mounted so as to pivot about a spindle 155 firmly fixed to the frame 114 and it controls the opposite reciprocating movements of an equilibrating mass 156 which is hinged at 157 and which is supported at its other end at 158 by a further connecting rod 159 pivotally mounted about an axle 160 firmly fixed to the casing 114.

Figure 6:
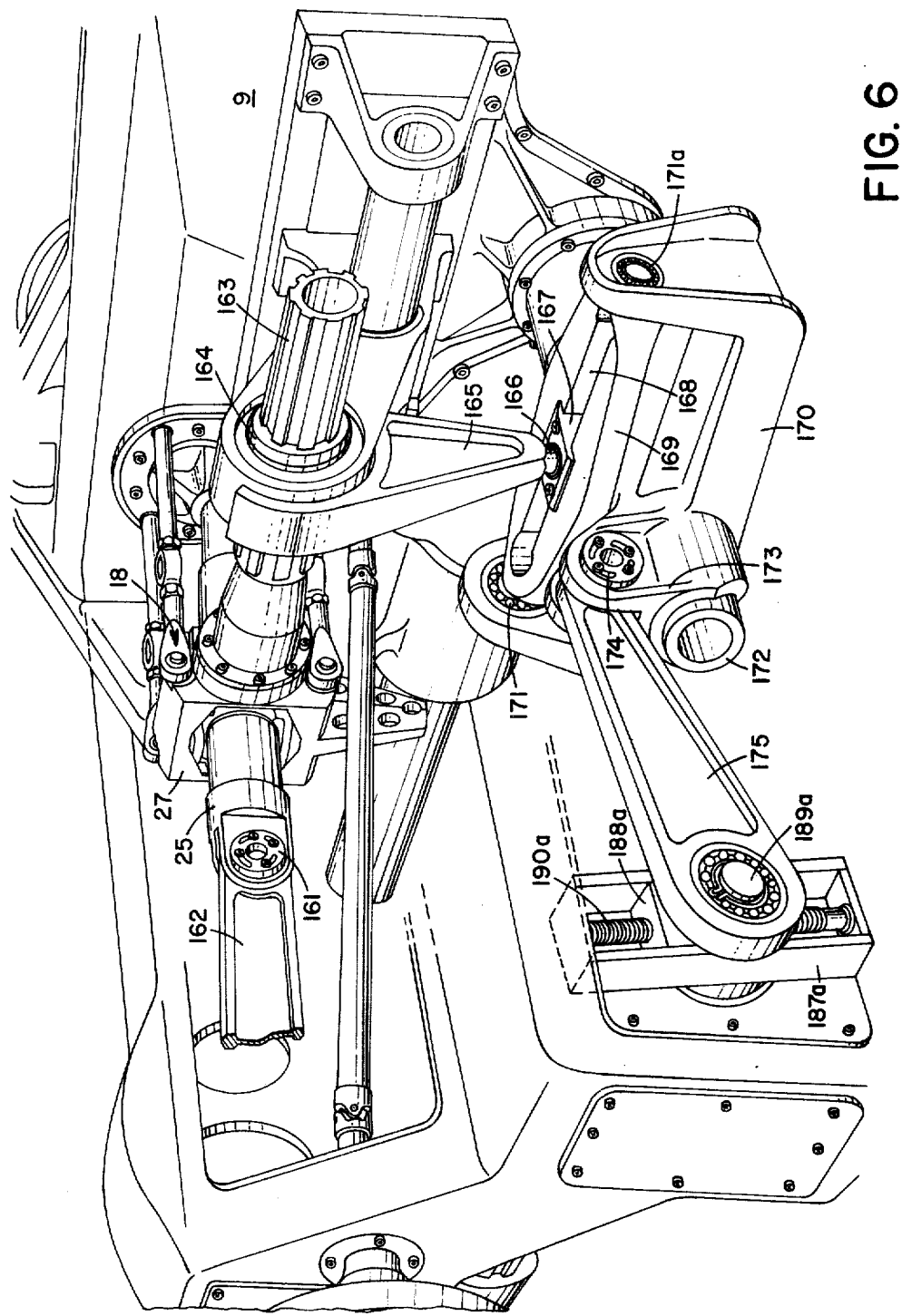
FIG. 6 is a perspective view of an alternative embodiment of the means for controlling the aligning device.
Figure 8:
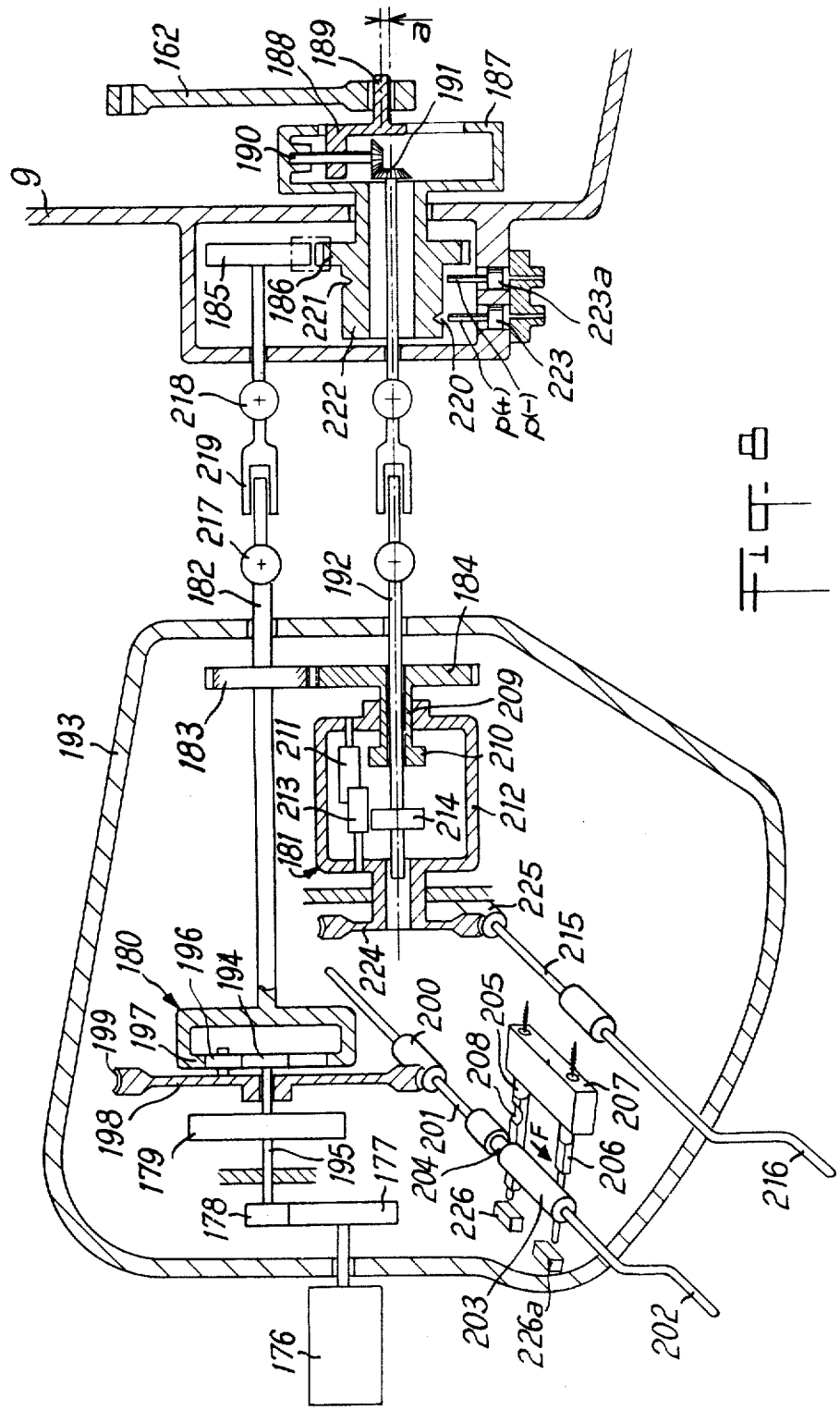
FIG. 8 is a view of the components forming one of the means for controlling the above-mentioned angles $\alpha$ or $\beta$.

One embodiment of the means for controlling the aligning device by means of jacks 45 and 46, and 65 and 66 has been represented in FIG. 2, whilst another embodiment of the means of control in which a rotating drive component is used has been represented in FIGS. 6, 7 and 8.

As represented in FIG. 6, the sleeve 25 which makes it possible to control the camber angle $\beta$ by means of the aligning hub 18, is connected via hinge 161 to a connecting rod 162, capable of a reciprocating movement of variable amplitude and actuated by a means of control which will be described below.

The carrier 27 which makes it possible to control the angle of lock $\alpha$ is firmly fixed to a splined shaft 163 on which is slidably mounted a ring 164, which ring has corresponding splines and is firmly fixed to a lever 165. The lever 165 has an axle 166 on which is pivotally mounted a sliding-block 167 inserted in a groove 168 of a part 169 mounted on a U-shaped component 170 by means of bearings 171 and 171a, for oscillatory rotation about an axis parallel to that of the splined shaft 163.

The U-shaped component 170 is itself slidably mounted on a rod 172 firmly fixed to the wheel-supporting carriage 9 along an axis perpendicular to both the axes of the splined shaft 163 and the groove 168.

The U-shaped component 170 has an arm 173 to which a connecting rod 175 is hinged by means of an axle 174, the connecting rod 175 being identical to the connecting rod 162 and controlled in the same way.

The entire device for controlling the connecting rods 162 and 175, which control respectively the camber angle $\beta$ and the angle of lock $\alpha$ has been represented schematically in FIG. 7. This combination comprises a rotary motor 176 which drives, by means of gearwheels 177, 178 and 178a, two identical means of control, each comprising an inertia flywheel 179 and 179a, respectively, a first differential 180 or 180a for producing a phase difference, and a second differential 181, 181a, respectively, for varying the amplitude. The second differentials 181, 181a are driven by the outlet shaft 182 and 182a of the first differential by means of pairs of gearwheels 183 and 184, and 183a and 184a, respectively. The outlet shafts 182 and 182a of the first differentials are connected via pairs of gearwheels 185 and 186, and 185a and 186a, respectively, to crank carrier wheels 187 and 187a, respectively, on which there are radically slidably mounted respective nuts 188, 188a having journals 189 and 189a to which the connecting rods 162 and 175 are articulated.

The nuts 188 and 188a are threaded over respective screws 190 and 190a rotated by means of a pair of conical gearwheels 191 and 191a by the respective outlet shafts 192 and 192a of the second differentials 181 and 181a.

One of the lines for transmitting the lock or camber movement, comprising the differentials 180 and 181 which are placed in a casing 193 fixed to the pier 3, has been shown in FIG. 8.

The first differential 180 comprises a planet gearwheel 194 keyed to an inlet shaft 195 connected to the shaft of the motor 176 by the pair of gearwheels 177 and 178, the said planet gearwheel meshing with satellite gearwheels 196 which mesh in their turn with a cogwheel 197 firmly fixed to the outlet shaft 182. The satellite gearwheels 196 are mounted on a cage 198 which has at its periphery concave gear teeth 199 threaded by engaging a worm screw 200 keyed to a shaft 201 having at one of its ends a control handle 202. A sleeve 203 is provided on the shaft 201, and this sleeve has a groove 204 in which elements 205 and 206 can be inserted selectively, these elements travelling perpendicularly to the shaft 201 under the action of the control component 207.

When the element 205 is inserted in the groove 204, the screw 200 meshes with the pinion teeth 199 and it is possible to rotate the cage 198 carrying the satellites 196. One of the elements 205 possesses a socket 208 of semi-circular shape which makes it possible for the shaft 201 and the screw 200 to shift in the direction of the arrow F in order to allow the said screw 200 to free itself from the pinion teeth 199. In the disengaged position the groove 204 is opposite the element 206 and the latter shifts in its turn and becomes inserted in the groove 204 to hold the screw 200 in the disengaged position.

The second differential 181 comprises an inlet shaft 209 which is firmly fixed to the wheel 184 and carries a sun gear 210 which meshes with satellite gearwheels 211 mounted in a cage 212 which cage also carries satellite gearwheels 213 meshing with a planet gearwheel 214 keyed to the outlet shaft 192. The cage 212 is firmly fixed to a pinion 224 which meshes with a worm screw 225 mounted on a shaft 215 which has a controlling control handle 216 at one of its ends.

The casing 193 being fixed and the carriage 9 being mobile allows the outlet shafts 182 and 192 to be connected by two universal joints 217 and 218 and a sliding joint 219.

The wheel hub which carries the experimental wheel 2 is oriented in two directions by means of the aligning hub 18 which makes it possible to incline the wheel at the angle of lock $\alpha$ and the camber angle $\beta$.

These two angles can be fixed at a given value or can be made to vary sinusoidally with a given amplitude by means of the second differential 181 and 181a. The crank carrier wheels, 187 in the case of the angle $\beta$ and 187a in the case of the angle $\alpha$, make it possible to give constant or changing values to the angles. Static values are fixed by immobilising the crank carrier wheels 187 and 187a in positions (+) or (−) by means of elements $p$ (+) and $p$ (−) which can penetrate into diametrically opposite recesses 220 and 221 of a bowl 222 keyed to each of the crank carrier wheels 187 and 187a.

The elements $p$ (+) and $p$ (−) are controlled by sliding pistons 223 and 223a which are mounted in a component firmly fixed to the casing of the carriage 9 and are actuated by a fluid under pressure.

For static measurements, the shaft 182 and the crank carrier wheel 187 are rotated by actuating the screw 200 and the differential 180, by means of the controlling control handle 202, in order to bring the crank carrier wheel 187 or 187a into one of the positions for which one of the elements $p$ (+) or $p$ (−) can be inserted into one of the recesses 220 or 221 of the bowl 222 and which are displaced relative to one another by 180°. This makes it possible, by rotation of the control handle 216, to act via the screw 225, the differential 181, the shaft 192 and the screw 190, on the nut 188 to alter the eccentric position $a$ of the journal 189 and consequently fixes the position of the connecting rod 162 or 175, for a positive or negative angle of lock or camber angle.

In order to make one or both of the camber angle and the angle of lock change sinusoidally, the operator frees the crank carrier wheel or wheels 187 and 187a, allowing the elements $p$ (+) or $p$ (+) to be retracted and disengaged from the recesses 220 or 221 of the bowl 222.

The crank carrier wheel or wheels 187 and 187a are made to move by means of the motor 176 which, via the differential 180, drives the shaft 182 and the crank carrier wheel 187. By means of the differential 181, the eccentricity $a$ of the journal 189 is adjusted by the control handle 216.

When the two means for controlling the camber angle and the angle of lock are used dynamically, it is possible to set up a phase difference in movement between the two crank carrier wheels 187 and 187a by acting on the differentials 180 and 180a by means of the control handle 202 which drives the endless screw 200, the pinion 199 and the carrier 197 for the planet gearwheels 196.

Since only a single motor 176 has been provided for driving the two shafts 182 and 182a and since it is sometimes necessary to subject the device to some modes of operation involving simultaneously holding one angle static and changing the other dynamically, there are provided on each of the transmissions of movement to the crank carrier wheels 187 and 187a, means for disengaging and interrupting the drive train. It is for this purpose that the screw 200 can move axially in the direction of the arrow F so as to bring the groove 204 into register with one of the elements 205 or 206 in order to hold the screw 200 in a position which is coupled with or disengaged from the pinion 199.

Micro-switch contacts 226 and 226a are positioned opposite the elements 205 and 206 and these contacts make it possible to sense when disengagement from the screw 200 has taken place and consequently when to start up the motor 176.

The operation of the contacts 226 and 226a is connected with the position of engagement or disengagement of the elements $p$ (+) and $p$ (−).

A device for rapidly reversing the carriage 9, to enable rapid withdrawal of the wheel 2 out of contact with the track 1, has been represented in FIG. 9. The screw 102 firmly fixed to the platform 95 has at one of its ends, articulated about a spindle 228, a tie-bar 229 which is articulated at its other end to a differential piston 232 about a spindle 230 on the piston crosshead 231. The differential piston 232 is slidably mounted in a jack cylinder 233 which has a journal 234 by which it is fixed to the support frame 97 by means of screws 235. The chambers 236 and 237 of the jack cylinder 233 are supplied normally with fluid at the same pressure via conduits 238 and 239 so that the piston 232 is pushed back into the position represented in FIG. 9 by virtue of the surface area SD of the piston in the chamber 236 which is greater than the surface area SD-Sd in the chamber 237.

In order to push the piston 232 back in the direction of the arrow A and thereby rapidly to reverse the carriage 9 which is connected to the load-varying device 94 and to the platform 95, hydraulic fluid under very high pressure is introduced into the chamber 237 via the conduit 239 which can be connected to a pressure accumulator, preferably an oil and air accumulator, the chamber 236 being vented simultaneously to the atmosphere.

In order to bring about the rapid backward movement, it would also be possible to use any other suitable means, for example an electric motor.

We claim:

1. A device for testing vehicle tyres comprising frame means, means supported by said frame means and defining a track, means for driving said track for movement along a given direction relative to said frame means, carriage means supported by said frame means, means slidably interconnecting said carriage means and said frame means for movement of said carriage means along a direction transverse to said given direction and extending towards and away from said track, means for driving said carriage for sliding movement along said transverse direction towards and away from said track, means for freely rotatably supporting a wheel and tyre combination on said carriage with said tyre in rolling contact with said track, said wheel supporting means including a wheel hub, and means for pivoting said wheel hub about two directions extending perpendicular to the axis of symmetry of said hub for orienting the wheel at an angle of lock $\alpha$ and a camber angle $\beta$ relative to said track, said means for pivoting said wheel hub including an alignment hub spaced from said wheel hub, means for tilting the alignment hub about two further perpendicular axes each perpendicular to the axis of said alignment hub, push rods extending parallel to one another between said alignment hub and said wheel hub, and means articulating said push rods to said alignment hub on the one hand and to the wheel hub on the other hand.

2. A device as set forth in claim 1, wherein said wheel hub includes a shaft, a sleeve slidable along said shaft, first carrier means supported by said sleeve, first journal means interconnecting said sleeve and said first carrier means allowing said first carrier means to pivot about a first one of the first mentioned axes which is perpendicular to that of said shaft, second journal means carried by said carrier means, second carrier means connected to said second journal means for pivotal movement about an axis perpendicular to both said shaft axis and the said first axis of pivoting, said push rods being articulated to said further carrier means, and means carried by said second carrier means for supporting a wheel and tyre combination for free rotation relative to said second carrier means.

3. A device as set forth in claim 2, wherein said alignment hub comprises a further sleeve mounted for sliding movement along said shaft, third journal means carried by said further sleeve, third carrier means carried by said third journal means for pivotal movement about a first one of said further axes of pivoting which is parallel to said first axis of pivoting, fourth journal means carried by said third carrier means and extending along a second one of said further axes parallel to the said second axis of pivoting, and fourth carrier means carried by said fourth journal means, said push rods being articulated to said fourth carrier means.

4. A device as set forth in claim 3, and including means for driving said further sleeve for sliding movement along said shaft.

5. A device as set forth in claim 4, wherein said drive means comprises a double action jack having a piston rod connected to said further sleeve.

6. A device as set forth in claim 4, and including a connecting rod connected to said further sliding sleeve of the aligning hub, and variable amplitude reciprocatory drive means linked to said connecting rod.

7. A device as set forth in claim 3, and including means for pivoting said third carrier means about said second further axes of pivoting.

8. A device as set forth in claim 7, wherein said means for pivoting said third carrier means comprises a jack, a lever connected to said jack for rotation in response to operation of said jack, a drive shaft extending between said lever and said third carrier means, and torque transmitting movement joint means connecting said drive shaft to said lever and said third carrier means.

9. A device as set forth in claim 7, and including a splined shaft slidably engaging said third carrier means of the aligning hub, a lever slidably mounted on said splined shaft, a sliding-block carried by said lever, trunion means, a U-shaped component pivotably supporting said trunion means for oscillation about an axis parallel to that of the splined shaft, means defining a groove in said trunion means for slidably receiving said sliding block, a rod firmly fixed to said carriage and slidably supporting said U-shaped component, an arm extending radially outwardly from said rod, a connecting rod having one end connected to said arm, and variable amplitude oscillatory drive means connected to the other end of said connecting rod.

10. A device as set forth in claim 9, wherein said variable amplitude oscillatory drive means comprises a motor, an inertia flywheel drivingly engaged by said motor, a first differential for producing a phase difference in the angle $\alpha$ or $\beta$, a second differential for varying the amplitude of the angle $\alpha$ or $\beta$, crank carrier means driven by said first differential, a nut threadedly slidable radially of said crank carrier, a crank-pin secured to said nut and to which said connecting rod is articulated, and screw means extending radially of said crank carrier and rotatable by the second differential for varying the eccentricity of the crank-pin and thus varying the amplitude.

11. A device as set forth in claim 10, wherein said first differential comprises an input shaft, sun gear means carried by said input shaft, planetary pinion means meshing with said sun gear means, ring gear means engaging said planetary pinion means, an output shaft firmly fixed to the ring gear means, planetary carrier means supporting said planetary pinion means, gear teeth formed on said planetary carrier means, and control screw means meshing with said gear teeth.

12. A device as set forth in claim 11, and including a shaft carrying said control screw means, means for locking the screw in two positions one of which corresponds to operative engagement of the screw and the gear teeth and the other of which corresponds to disengagement.

13. A device as set forth in claim 11, and including rotor means fixed to said crank carrier means, means defining two orienting recesses in said rotor means, and immobilising elements positioned to be inserted selectively in said recesses depending on the orientation of said rotor means.

14. A device as set forth in claim 10, wherein said second differential comprises a cage, first and second planetary pinion sets in said cage, first and second sun wheels meshing with the respective first and second planetary pinion sets, input shaft means fixedly supporting said second sun wheel, output shaft means fixedly supporting the first sun wheel, a pinion fixed to said cage, and a control screw meshing with said pinion.

15. A device as set forth in claim 3, and including a rod fixed to said fourth carrier means, a ball-and-socket joint connected to one end of said rod, and lever means carrying said ball-and-socket joint, and means for pivotally oscillating said lever relative to said frame means.

16. A device as set forth in claim 15, wherein said means for pivotally oscillating said lever comprises a second rod, means mounting said lever slidably on said rod for movement longitudinally of said second rod, a sliding block carrying said second rod, and means slidably supporting said sliding block on the frame means.

17. A device as set forth in claim 1, wherein said shaft consists of two parts, and further including two spring leaves, means fixing the spring leaves at one of their ends to a first of said shaft parts, a block hinged to the other ends of the spring leaves for pivoting motion about hinge axes, and a housing secured to the carriage and hingedly supporting said block for pivoting motion about an axis perpendicular to said hinge axes, said wheel hub being carried by said first shaft part.

18. A device as set forth in claim 17, including stress gauge means mounted on both faces of at least one of the spring leaves for measuring the bending moment in said at least one spring leaf.

19. A device as set forth in claim 17, and including first rod means fixed to the turret, second rod means hinged at one end to the block and fixed at its other end to the carriage and a tensometer carried by said second rod means, said second rod means being parallel to the shaft.

20. A device for testing vehicle tyres comprising frame means, means supported by said frame means and defining a track, means for driving said track for movement along a given direction relative to said frame means, carriage means supported by said frame means, means slidably interconnecting said carriage means and said frame means for movement of said carriage means along a direction transverse to said given direction and extending towards and away from said track, means for freely rotatably supporting a wheel and tyre combination on said carriage with said tyre in rolling contact with said track, said wheel supporting means including a wheel hub pivotable about two directions extending perpendicular to the axis of symmetry of said hub for orienting the wheel at an angle of lock $\alpha$ and a camber angle $\beta$ relative to said track, and means for driving said carriage for sliding movement along said transverse direction towards and away from said track, said carriage driving means comprising connecting rod means connected at one end to the carriage, a load-varying device connected at the other end of said connecting rod means, a mobile platform supporting said load-varying device, rails movably supporting said mobile platform, support frame means carrying said rails, elastic mounting means connecting said rails to said support frame means, control screw transmission means connecting said mobile platform to the support frame means, jack means having a jack piston rod in contact with said mobile platform and a jack cylinder engaging said support frame means, flat slide-bar means formed on said mobile platform and mounted for sliding movement adjacent said support frame means, and immobilising jack means firmly attached to the fixed support frame means and acting in opposition to the elastic mounting means, said immobilising jack means having pistons arranged to move slidably towards and away from said mobile platform.

21. A device as set forth in claim 20, wherein said load-varying device comprises a casing, crank-shaft means mounted within said casing for rotation about a first rotation axis, a single crank-pin carried by said crank-shaft means and concentric about an eccentric axis extending parallel to but laterally spaced from said first rotation axis, rotor means freely rotatably carried by said crank-pin for rotation about said eccentric axis an eccentric journal portion formed on said rotor and concentric about an axis spaced laterally from said eccentric axis by a distance equal to the lateral spacing between said first axis of rotation and said eccentric axis, said connecting rod means being articulated to said eccentric journal portion, ring gear means formed on said rotor means, planetary pinion means freely rotatably carried by said crank-shaft means and meshing with said ring gear, sun gear means meshing with said planetary pinion means, differential control means connected to said sun gear means, motor means operably connected to said crank-shaft means, inertia flywheel means carried by and driven by said motor means, radially outwardly extending flange means formed on said rotor means, and clamping means carried by the crank-shaft for dampingly engaging said flange means.

22. A device as set forth in claim 21, and further including push rod means connected between said connecting rod means and the carriage, and reciprocating equilibrating mass means coupled to said connecting rod.

23. A device as set forth in claim 20, wherein said control screw transmission includes a controlling screw firmly fixed to the carriage, and further including a differential piston, a cylinder in which said differential piston is slidably mounted to be subjected on both its faces to the action of a hydraulic fluid, and a tie bar connecting said differential piston to said controlling screw for rapidly withdrawing the tyre from the track.

* * * * *